(12) United States Patent
Lee et al.

(10) Patent No.: US 10,459,788 B2
(45) Date of Patent: Oct. 29, 2019

(54) DATA CODING TO REDUCE READ-SENSING OPERATIONS IN STORAGE DEVICE

(71) Applicants: SAMSUNG ELECTRONICS CO., LTD., Suwon-si, Gyeonggi-do (KR); KOREA ADVANCED INSTITUTE OF SCIENCE AND TECHNOLOGY, Daejeon (KR)

(72) Inventors: Donghwan Lee, Namyangju-si (KR); Sae-Young Chung, Daejeon (KR); Lanying Zhao, Daejeon (KR); Sungik Choi, Daejeon (KR); Junjin Kong, Yongin-si (KR); Changkyu Seol, Osan-si (KR); Hyejeong So, Suwon-si (KR); Hong Rak Son, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 130 days.

(21) Appl. No.: 15/676,623

(22) Filed: Aug. 14, 2017

(65) Prior Publication Data
US 2018/0052733 A1 Feb. 22, 2018

(30) Foreign Application Priority Data
Aug. 19, 2016 (KR) .................. 10-2016-0105370

(51) Int. Cl.
*G06F 11/10* (2006.01)
*G06F 11/00* (2006.01)
*G06F 3/06* (2006.01)

(52) U.S. Cl.
CPC .................. *G06F 11/1072* (2013.01)

(58) Field of Classification Search
None
See application file for complete search history.

(56) References Cited

U.S. PATENT DOCUMENTS

| 7,679,133 B2 | 3/2010 | Son et al. |
| 7,724,587 B2 | 5/2010 | Song et al. |
| 8,385,117 B2 | 2/2013 | Sakurada et al. |
| 8,553,466 B2 | 10/2013 | Han et al. |
| 8,559,235 B2 | 10/2013 | Yoon et al. |

(Continued)

OTHER PUBLICATIONS

Erdal Arikan et al., "Channel Polarization: A Method for Constructing Capacity-Achieving Codes for Symmetric Binary—Input Memoryless Channels", IEEE Transactions on Information Theory, vol. 55, No. 7, Jul. 2009, pp. 3051-3073.

(Continued)

*Primary Examiner* — Justin R Knapp
(74) *Attorney, Agent, or Firm* — Volentine, Whitt & Francos, PLLC

(57) ABSTRACT

A method of decoding may include performing fewer than $$\left\lfloor \frac{2^k-1}{k} \right\rfloor$$

number of sensing operations of multilevel cells within a nonvolatile memory device, decoding pages corresponding to each of the sensing operations while correcting a channel error using an RIO code, and extracting user data from the decoded pages.

18 Claims, 11 Drawing Sheets

(56) References Cited

U.S. PATENT DOCUMENTS

| | | | |
|---|---|---|---|
| 8,654,587 | B2 | 2/2014 | Yoon et al. |
| 9,070,427 | B2 | 6/2015 | Sharon et al. |
| 9,256,522 | B1 | 2/2016 | Tang et al. |
| 2011/0233648 | A1 | 9/2011 | Seol et al. |
| 2012/0210082 | A1* | 8/2012 | Sharon ............... G11C 7/1006 711/154 |
| 2013/0318420 | A1 | 11/2013 | Seol et al. |
| 2014/0019820 | A1 | 1/2014 | Vardy et al. |
| 2014/0169102 | A1 | 6/2014 | Sun et al. |
| 2015/0006791 | A1 | 1/2015 | Yoo et al. |
| 2015/0091742 | A1* | 4/2015 | Ionita ..................... H03M 5/18 341/57 |
| 2015/0236715 | A1* | 8/2015 | Alhussien ............... H03M 7/40 341/67 |
| 2015/0381208 | A1 | 12/2015 | Li et al. |
| 2016/0299813 | A1* | 10/2016 | Seol ..................... G06F 3/0619 |
| 2016/0335156 | A1* | 11/2016 | En Gad ............... G06F 11/1012 |
| 2018/0248567 | A1* | 8/2018 | Qu ........................ H03M 13/13 |

OTHER PUBLICATIONS

Eren Şaşoğlu (2012), "Polarization and polar codes", Foundations and Trends in Communications and Information Theory: vol. 8: No. 4, pp. 259-381.

Junya Honda et al., "Polar coding without alphabet extension for asymmetric models", IEEE Trans. Inf. Theory, vol. 59, No. 12, Dec. 2013, pp. 7829-7838.

Naveen Goela et al., "Polar Codes for Broadcast Channels", IEEE Transactions on Information Theory, vol. 61, No. 2, Feb. 2015, pp. 758-782.

Eran Sharon et al., "Coding Scheme for Optimizing Random I/O Performance", Feb. 29, 2012, http://arxiv.org/abs/1202.6481, pp. 1-5.

R. L. Rivest et al., "How to reuse a 'write-once' memory", Information and Control, vol. 55, 1982, pp. 1-19.

K. Marton, "A coding theorem for the discrete memoryless broadcast channel", IEEE Trans. Inf. Theory, vol. 25, No. 3, May 1979, pp. 306-311.

Lanying Zhao et al. "Polar Code Design for Noisy Blackwell Channels", IEEE Communications Letters Year: 2016, vol. 20, Issue: 8, pp. 1495-1498.

\* cited by examiner

DATA CODING TO REDUCE READ-SENSING OPERATIONS IN STORAGE DEVICE

CROSS-REFERENCE TO RELATED APPLICATIONS

This U.S. non-provisional patent application claims priority under 35 U.S.C. § 119 of Korean Patent Application No. 10-2016-0105370, filed on Aug. 19, 2016, the entire contents of which are hereby incorporated by reference.

BACKGROUND

The disclosure relates to storage devices, and more particularly, to a method of operating the same.

In a flash memory, several bits of data are stored per cell to store more bits in the same cell. As the number of bits stored per cell increases, more memory sensing processes are needed to read data and thereby read performance of a NAND flash memory is degraded. To prevent performance degradation, a technology of RIO (random input/output) code has been suggested recently. In a conventional RIO code, a design is performed without considering a noise that occurs in a flash memory channel. Thus, a bit error that occurs in the process of reading a flash memory is amplified while passing through an RIO decoder and thereby the number of error bits greatly increases as compared with the original number of error bits.

SUMMARY

Example embodiments of the disclosure provide a method of operating a storage device. The method may include encoding user data using an RIO code, programming the encoded data in multilevel cells, reading a part of the user data from the multilevel cells by a one-time memory sensing operation, and decoding the read date while correcting a channel error using the RIO code. The RIO code comprises a channel code for correcting a channel error.

Example embodiments of the disclosure provide a method of decoding information stored by a storage device including a nonvolatile memory device having k-bit multilevel cells and a memory controller that controls the nonvolatile memory device. The method may include performing fewer than $$\left\lfloor \frac{2^k - 1}{k} \right\rfloor$$

number of sensing operations (here, $\lfloor \; \rfloor$ is a floor operator) of the multilevel cells, decoding pages corresponding to each of the sensing operations while correcting a channel error using an RIO code, and extracting user data from the decoded pages.

Example embodiments of the disclosure provide a storage device. The storage device may include at least one nonvolatile memory device having k-bit multilevel cells, and a memory controller that controls the at least one nonvolatile memory device. The memory controller comprises an error correction encoder configured to encode user data using a first code to produce first-encoded data, an RIO encoder configured to encode the first-encoded data using a second code, an RIO decoder configured to decode pages read from the k-bit multilevel cells through fewer than $$\left\lfloor \frac{2^k - 1}{k} \right\rfloor$$

number of sensing operations while recovering a channel error, and an error correction decoder configured to decode each of the decoded pages using the first code to correct an error.

BRIEF DESCRIPTION OF THE FIGURES

Embodiments of the disclosure will be described below in more detail with reference to the accompanying drawings. The embodiments of the disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION OF THE EMBODIMENTS

Figure 1:
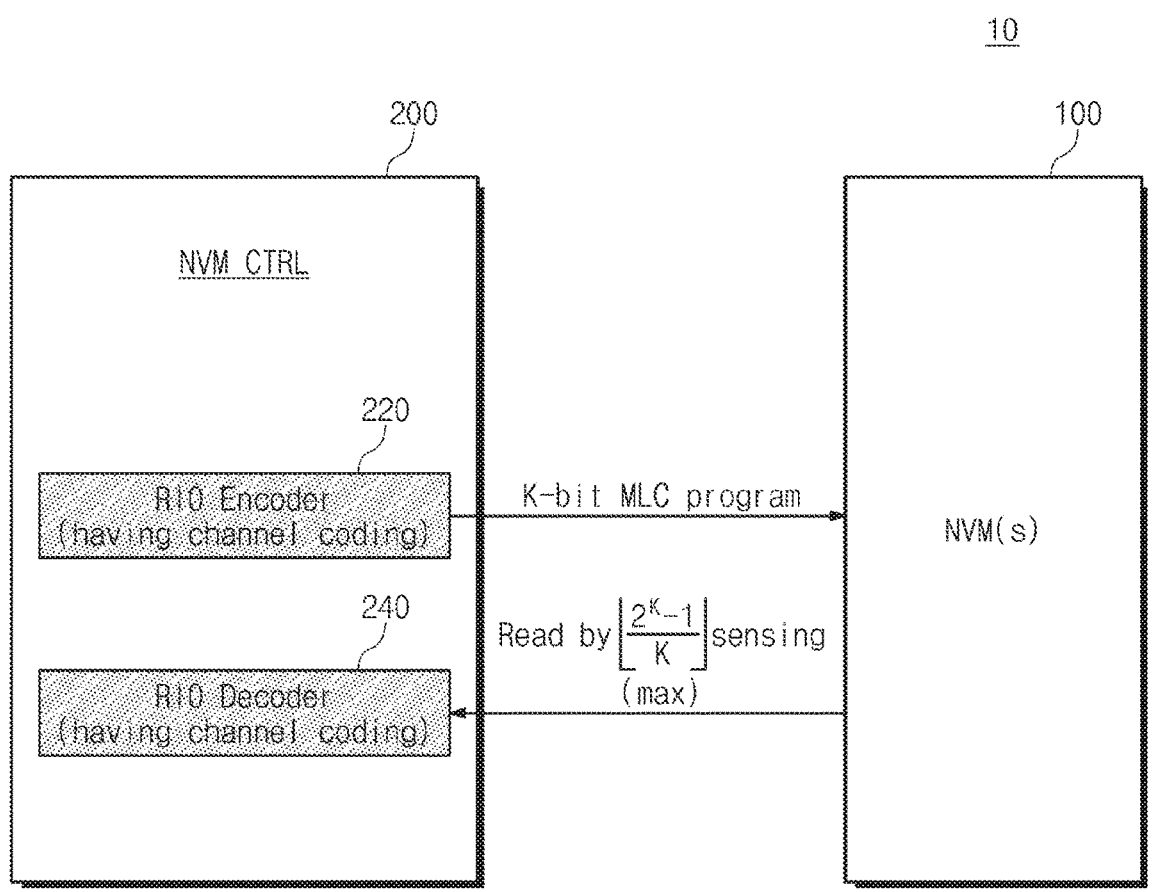
FIG. 1 is a view illustrating a storage device according to example embodiments of the disclosure.

Embodiments of disclosure will be described more fully hereinafter with reference to the accompanying drawings, in which embodiments of the invention are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

FIG. 1 is a view illustrating a storage device 10 according to example embodiments of the disclosure. Referring to FIG. 1, the storage device 10 may include at least one nonvolatile memory device (NVM) 100 and a memory controller (CTRL) 200 that controls the at least one nonvolatile memory device (NVM) 100. The storage device 10 may be a solid state drive (SSD), a universal flash storage (UFS) device, an embedded multimedia card (eMMC), a secure digital (SD) card, or the like.

The at least one nonvolatile memory device (NVM) 100 may be embodied to store data. The at least one nonvolatile memory device (NVM) 100 may include a NAND flash memory, a vertical NAND flash memory (VNAND), a NOR flash memory, a resistive random access memory (RRAM), a phase-change random access memory (PRAM), a magneto resistive random access memory (MRAM), a ferroelectric random access memory (FRAM), a spin transfer torque random access memory (STT-RAM), a thyristor random access memory (TRAM), etc.

The nonvolatile memory may be embodied to have a three dimensional (3D) array structure. In an embodiment of the present disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present disclosure, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The nonvolatile memory (NVM) of the disclosure is applicable to not only a flash memory device of which a charge storage layer is constituted by a conductive floating gate but also a charge trap flash (CTF) memory device of which a charge storage layer is constituted by an insulating layer.

The at least one nonvolatile memory device 100 may include a plurality of memory cells. Each of the nonvolatile memory cells may be a multi-bit cell (MLC) that stores multi-bit data. For example, each of the nonvolatile memory cells may store k-bit data.

The memory controller 200 is connected to the at least one nonvolatile memory device 100 through at least one memory channel and may be embodied to control a program/read operation of the at least one nonvolatile memory device 100.

The memory controller 200 may include an RIO (random input/output) encoder 220 and an RIO decoder 240.

The RIO encoder 220 may be embodied to receive user data and to convert the user data according to an encoding algorithm of an RIO code. Here, the RIO code may encode user data so that user data stored in k (k is an integer greater than 1) bit multilevel cells (MLCs) is extracted by a maximum $$\left\lfloor \frac{2^k - 1}{k} \right\rfloor$$

number of times of sensing operations (here, $\lfloor \ \rfloor$ is a floor operator) while recovering a bit error inside a memory channel.

The RIO code may include a channel coding for recovering an error of a memory channel and may be embodied using a polar code.

Encoded data may include data bits, RIO code parity, and channel parity. A location of the data bits, the RIO code parity, or the channel parity may be determined by conditional entropy. Alternatively, a location of the data bits, the RIO code parity, or the channel parity may be determined by a Bhattacharyya parameter.

The RIO decoder 240 may be embodied to decode encoded data read by the nonvolatile memory device 100 according to an RIO code algorithm. For example, the RIO decoder 240 may extract a part of user data while recovering a channel error by decoding page data read by one memory sensing operation.

A conventional storage device performs an RIO code and an error correction code (ECC) separately. In a write operation, a parity bit is added to the user data in an ECC encoding operation to correct a bit error of the user data that occurs in the nonvolatile memory device. In a conventional storage device, the number of bit errors that occur in a nonvolatile memory device due to charge loss, read disturbance, etc. may greatly increase when the data passes through the RIO decoder. This is called error propagation. The error propagation means that an error of a specific location is propagated to different locations while performing all sorts of arithmetic operations using data including a bit error. Even if the number of bit errors that occur in the nonvolatile memory device is very small, the number of errors may increase to a level beyond ECC capability while passing through the RIO decoder.

The storage device 10 can reduce or remove error propagation as compared with a conventional storage device by performing an RIO code decoding and a channel code decoding at the same time in the RIO decoder 240. For example, the RIO decoder 240 can greatly reduce or remove error propagation as compared with a conventional RIO decoder by including a function of correction a channel error.

The storage device 10 may be embodied by an RIO code using a polar code. For convenience of description, a method of designing an RIO code using a polar code will be described. However, a channel coding of the disclosure is not limited thereto. First, the method of designing an RIO code may perform an operation of a broadcast channel modeling. After that, a polar encoding method and a polar decoding method may be designed based on the modeled channel.

Figure 2:
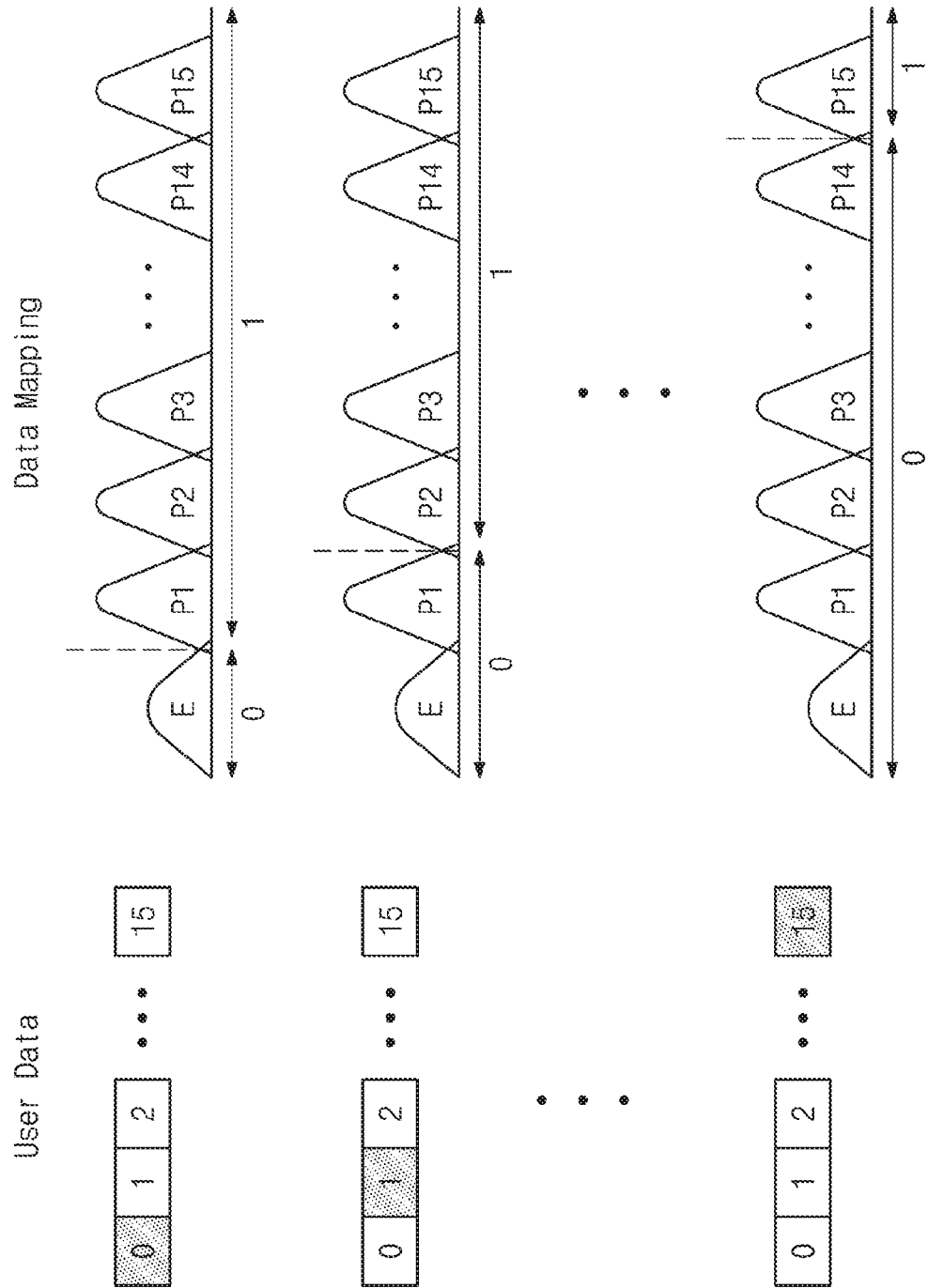
FIG. 2 is a view illustrating a user data distinguishment and a data mapping method in a storage device according to example embodiments of the disclosure.

FIG. 2 is a view illustrating a user data distinguishment and a data mapping method in a storage device 10 according to example embodiments of the disclosure. An RIO code according to example embodiments of the disclosure can detect a kth data chunk using a threshold voltage (or, read level) that can distinguish between a k−1th state and a kth state by dividing user data into L−1 number of small data chunks (or 'pages') and encoding the kth (k is a natural number) data chunk. For convenience of description, in FIG. 2, a user data classification and a data mapping method with respect to a 4-bit MLC are illustrated.

Referring to FIG. 2, a first data chunk of the user data can be read by distinguishing between an erase state (E) and first through fifteenth program states (P1 to P15). A second data chunk of the user data can be read by distinguishing between the states (E, P1) equal to or lower than the first program state P1 and the remaining program states (P2 to P15). Similarly, a fifteenth data chunk of the user data can be read by distinguishing between the states (E, to P14) equal to or lower than the fourteenth program state P14 and the remaining program states (P15). That is, the RIO code can generate a data chunk corresponding to a read level that distinguishes the states (E, P1 to P15) respectively. In the case where the RIO encoding method is used, one data chunk may be read whenever a sensing operation is performed.

Figure 3:
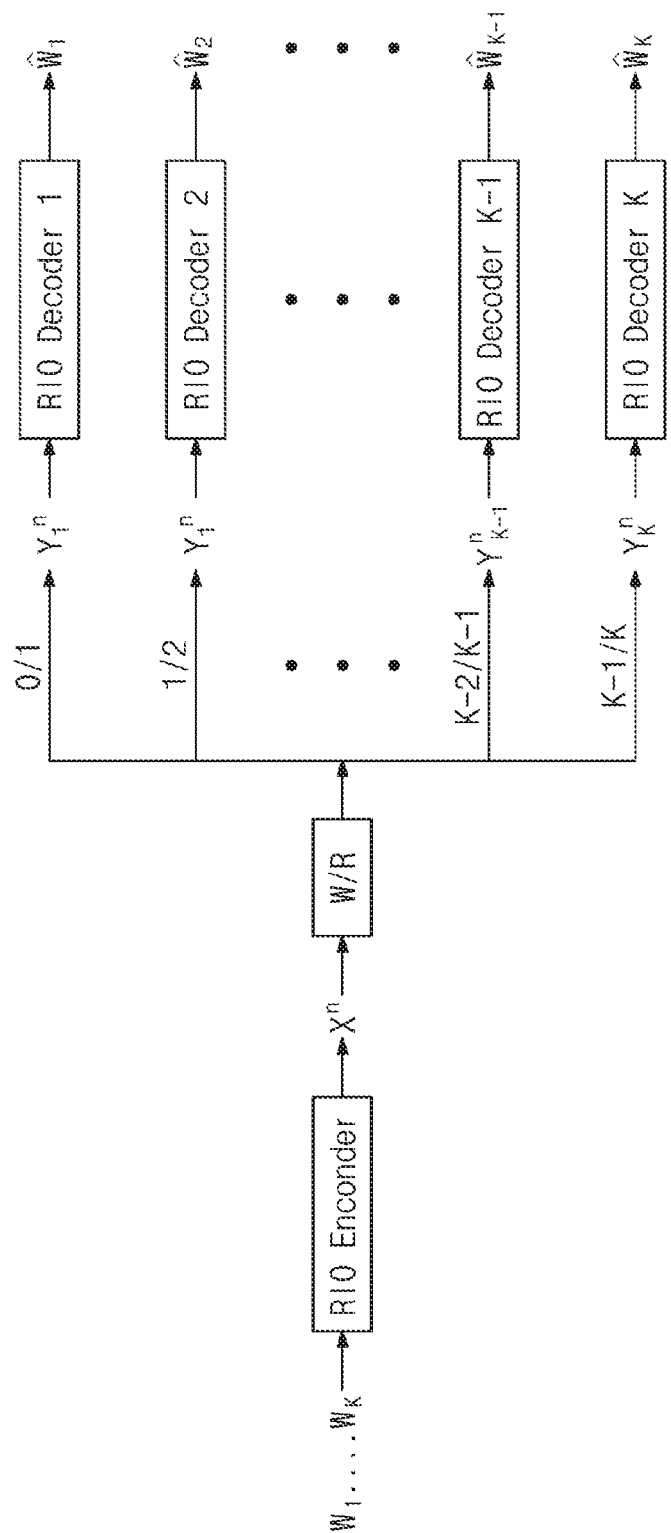
FIG. 3 is a view illustrating an RIO (random input/output) code modeling for an L-level memory cell in a storage device according to example embodiments of the disclosure.

FIG. 3 is a view illustrating an RIO code modeling for an L-level memory cell in a storage device 10 according to example embodiments of the disclosure. Referring to FIG. 3, the RIO coding method may be modeled as follows.

User data may include K number of small data chunks ($W_1, W_2, \ldots, W_K$, or 'pages'). Here, $W_1$ is a data chunk that can be read through an operation of sensing a valley between the E and the P1 and the $W_K$ is a data chunk that can be read through a kth threshold voltage sensing operation.

The K number of data chunks pass through the RIO encoder 220 (refer to FIG. 1) to be converted into $X^n$ and the converted $X^n$ may be stored in a memory cell. After that, to obtain a necessary data chunk $W_K$, the following operation will be performed. $Y_K^n$ is obtained by performing a sensing operation between a K−1 th state and a Kth state. The $Y_K^n$ may be determined by a mathematical formula below.

$$y_{k,j} = \begin{cases} 0 & \text{if } x_j < k \\ 1 & \text{if } x_j \geq k \end{cases}, \quad \text{[mathematical formula 1]}$$

$$k = 1, 2, \ldots, K, \quad j = 1, 2, \ldots, n.$$

In the case where the $Y_K^n$ passes through the RIO decoder 240 (refer to FIG. 1), $\hat{W}_k$ obtained by decoding the user data may be calculated.

Figure 4:
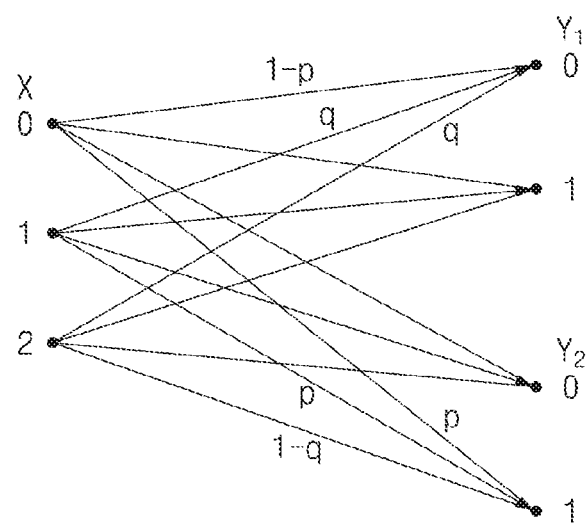
FIG. 4 is a view illustrating an embodiment of an RIO code modeling for a 3-level cell in a storage device according to example embodiments of the disclosure.

FIG. 4 is a view illustrating an embodiment of an RIO code modeling for a 3-level cell in a storage device 10 according to example embodiments of the disclosure. Since a program operation and a read operation of the nonvolatile memory device 100 (refer to FIG. 1) are not ideal, a thermal noise, a programming noise, interference between cells, interference between adjacent levels, etc. may exist. Considering those effects, the RIO code design may be modeled as illustrated in FIG. 4. Here, p is the probability that may happen and q is the probability that may not happen.

Figure 5:
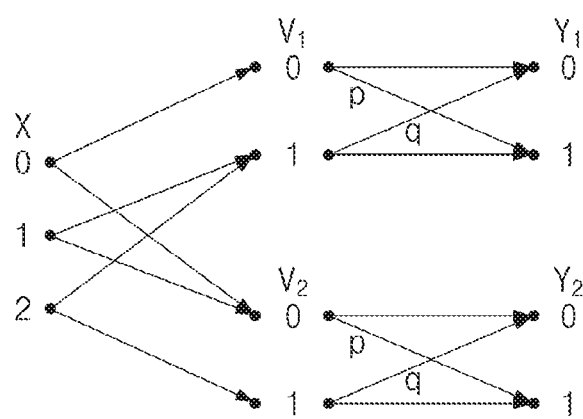
FIG. 5 is a view illustrating another embodiment of an RIO code modeling for a 3-level cell in a storage device according to example embodiments of the disclosure.

FIG. 5 is a view illustrating another embodiment of an RIO code modeling for a 3-level cell in a storage device 10 according to example embodiments of the disclosure. Referring to FIG. 5, the RIO code modeling is a deterministic broadcast channel and may be constituted by parts (V1, V2) in which a noise does not exist and binary channel parts (Y1, Y2) in which a noise exists. The RIO code modeling has a powerful effect on a Blackwell channel noise.

Figure 6:
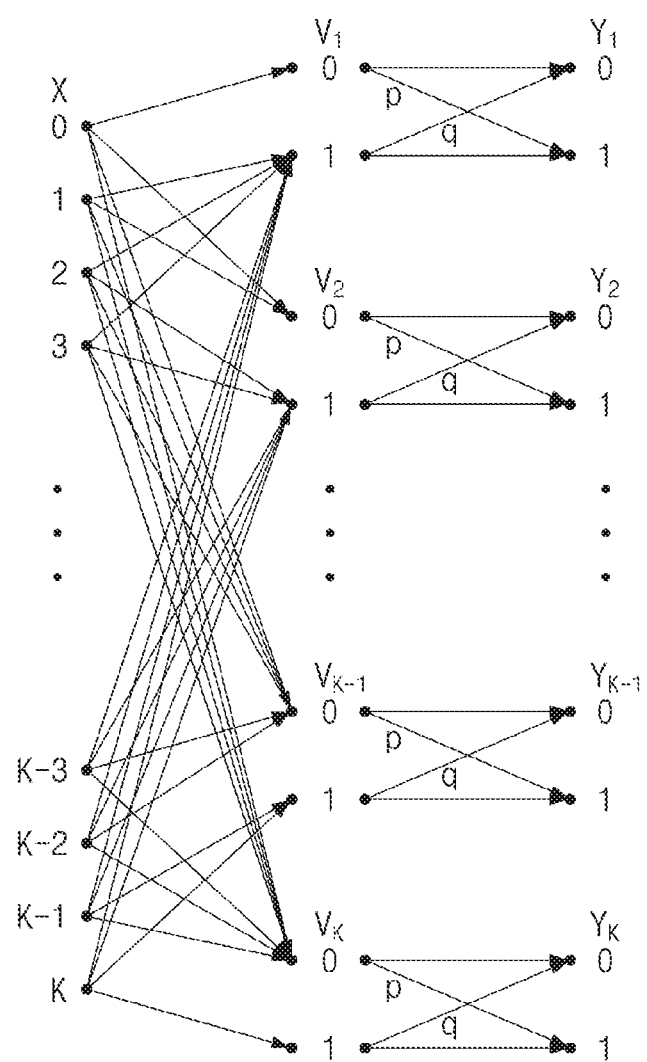
FIG. 6 is a view illustrating that an RIO code modeling illustrated in FIG. 5 extends to an RIO code modeling for a K level cell.

FIG. 6 is a view illustrating a modeling in which the RIO code modeling illustrated in FIG. 5 extends to an RIO code modeling having K number of chunks. Referring to FIG. 6, after each of states (X, 0 to K) corresponding to the K number of chunks is mapped through the deterministic broadcast channel (V1 to $V_K$), it may be mapped to a corresponding binary channel (Y1 to $Y_K$).

The storage device according to example embodiments of the disclosure may further include an error correction code.

Figure 7:
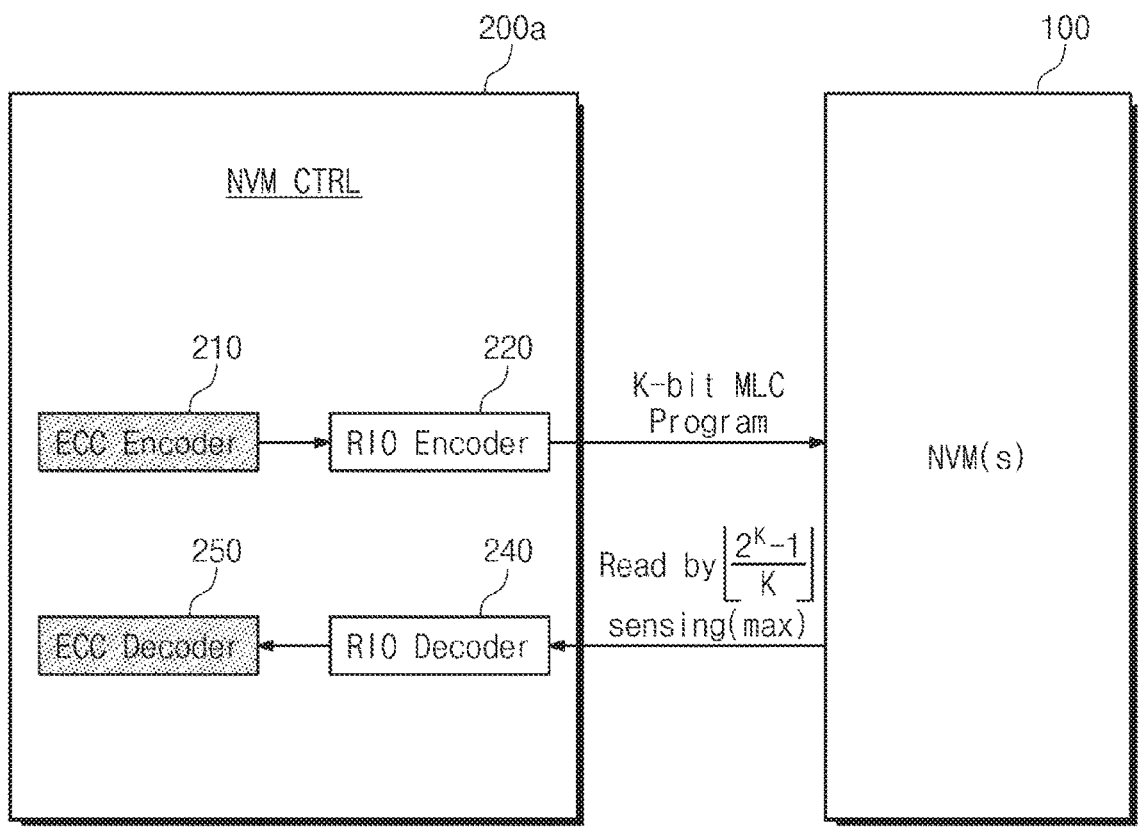
FIG. 7 is a view illustrating a storage device according to other example embodiments of the disclosure.

FIG. 7 is a view illustrating a storage device 20 according to other example embodiments of the disclosure. Referring to FIG. 7, the storage device 20 may include at least one nonvolatile memory device 100 and a memory controller 200a that controls the at least one nonvolatile memory device 100.

The memory controller 200a may further include an ECC encoder 210 and an ECC decoder 250 that perform a memory controller ECC as compared with FIG. 1.

The ECC encoder 210 may be configured to receive data, to generate parity corresponding to the data using an ECC code (or, 'first code'), and to transmit the data including the parity to an RIO encoder 220. The ECC code may be a LDPC (low density parity check), a BCH (Bose-Chaudhuri-Hocquengham) code, a turbo code, a Reed-Solomon code, a convolution code, an RSC (recursive systematic code), a TCM (trellis-coded modulation), a BCM (block coded modulation), or the like.

The ECC decoder 250 may be configured to detect and correct an error of data by receiving data and a parity value from the RIO decoder 240 and decoding the received data and parity value using an ECC code (or, 'first code').

In the description that follows, an embodiment of an RIO encoder/decoder using a polar code will be described in more detail. The polar code invented by E. Arikan is a code that uses a channel deflection phenomenon and is a channel code that achieves a margin of an information theory claimed by Shannon. The channel deflection phenomenon indicates a phenomenon where a new vector channel $W_{vec}$ obtained by multiplying n number of i.i.d. (independent identically distributed) channels W by a matrix $G_n$ (deflection matrix) that can cause a deflection phenomenon is divided into a channel that can perfectly recover a signal and a channel that cannot recover a signal.

Figure 8:
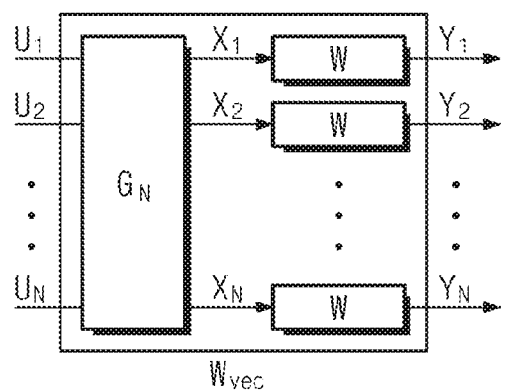
FIG. 8 is a view illustrating a vector channel $W_{VEC}$ newly obtained and a new input signal $U''$ corresponding to the vector channel $W_{VEC}$.

FIG. 8 is a view illustrating a vector channel $W_{vec}$ newly obtained and a new input signal $U^n$ corresponding to the vector channel $v_{vec}$. The vector channel $W_{vec}$ may divided into n number of channels that are not i.i.d. (independent identically distributed) any more.

Figure 9:
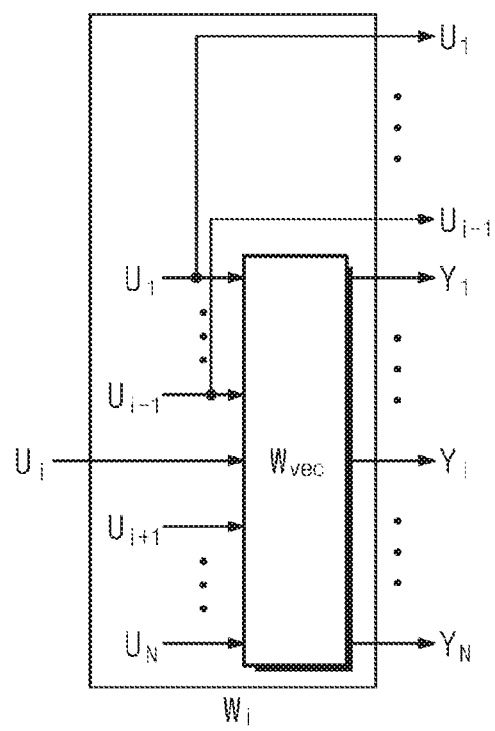
FIG. 9 is a view illustrating a new vector channel divided into n number of deflection channels.

FIG. 9 is a view illustrating a new vector channel divided into n number of deflection channels. A mathematical formula corresponding to a divided deflection channel is illustrated below.

$$W_i : U_L \to (U^{i-1}, Y^n) \quad i = 1, 2, \ldots n \quad \text{[mathematical formula 2]}$$

The divided n number of channels has an aspect of being converged on a perfectly good channel or a bad channel that cannot recover a signal due to a noise. As the n becomes great, this phenomenon becomes obvious. If indexes of channels deflected toward a good channel are known, a safe communication can be performed by loading information to be transmitted into a corresponding location of a new input signal and loading an already promised bit (e.g., '0') into channels that converge on a bad channel. The maximum amount of messages that can be transmitted through the vector channel $W_{vec}$ using a deflection phenomenon when n is sufficiently great, that is, the number of channels deflected toward a good channel is $nR \approx nI(X; Y)$.

When an input signal of a channel is a binary signal and n is a square number, that is, when $n=2^m$, Arikan proved the deflection phenomenon described above using a deflection matrix $G_n$ according to a mathematical formula below.

$$G_n = \begin{bmatrix} 1 & 0 \\ 1 & 1 \end{bmatrix}^{\otimes m} \qquad \text{[mathematical formula 3]}$$

Here, $\otimes$ means a kronecker product operation of a matrix. A design of RIO code scheme of a k+1 level using the polar code is as follows.

A method of extracting data by one time (tR) in a nonvolatile memory device having k+1 number of states was modeled in FIG. 6. A method of encoding a polar code will be described based on the modeling described above.

A process of encoding a polar code is performed as follows. A bit index having a low error rate expected in a channel is filled with user data as it is. A bit index having a high error rate expected in a channel is filled with a signal known to an encoder and a decoder. A result obtained through the process described above is multiplied by $G_n$.

Figure 10:
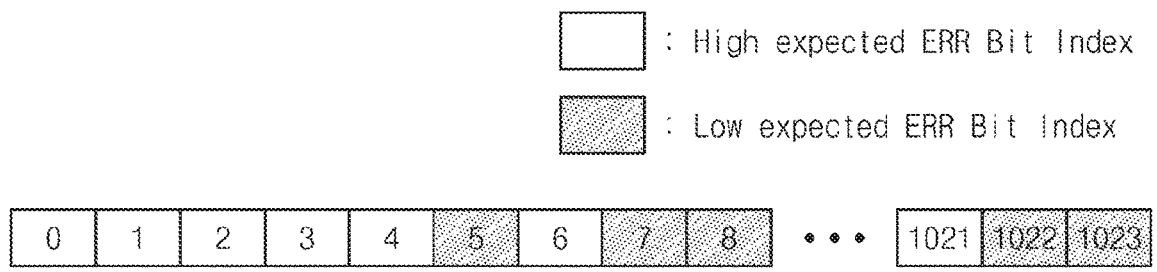
FIG. 10 is a view illustrating a deflection channel according to example embodiments of the disclosure.

FIG. 10 is a view illustrating a deflection channel according to example embodiments of the disclosure. Bit indexes having a high error rate expected in a channel and bit indexes having a low error rate expected in a channel are illustrated. In the case where user data is stored in the bit indexes having a high error rate expected in a channel, the probability that data is not recovered in a decoder increases. Alternatively, in the case where user data is stored in the bit indexes having a low error rate expected in a channel, the user data can be successfully decoded in a decoder.

Before performing an encoding of RIO code, a characteristic of each bit index in a deflected channel has to be understood and which one is used among user data, RIO data and ECC parity has to be determined. This is known by a Bhattacharyya parameter value. When a binary input signal probability distribution p(x) and a channel transition probability distribution p(y|x) are given, the Bhattacharyya parameter can be calculated by a mathematical formula below.

$$Z(X \mid Y) = \sum_y \sqrt{p(y \mid x=0)p(x=0)p(y \mid x=1)p(x=1)}. \qquad \text{[mathematical formula 4]}$$

Using the Bhattachharyya parameter, each bit index can be classified like a mathematical formula below.

$H_{V_j|V_{[1,j-1]}} = \{i \in [1:n] : Z(u_{j,i}|u_j^{1:i-1} v_{[1,j-1]}^{1:n}) \geq 1-\delta_n\}$ $L_{V_j|V_{[1,j-1]}} = \{i \in [1:n] : Z(u_{j,i}|u_j^{1:i-1} v_{[1,j-1]}^{1:n}) \leq \delta_n\}$ $H_{V_j|Y_j} = \{i \in [1:n] : Z(u_{j,i}|u_j^{1:i-1} y_j^{1:n}) \geq 1-\delta_n\}$ $L_{V_j|Y_j} = \{i \in [1:n] : Z(u_{j,i}|u_j^{1:i-1} y_j^{1:n}) \leq \delta_n\}$ $H_{V_j} = \{i \in [1:n] : Z(u_{j,i}|u_j^{1:i-1}) \geq 1-\delta_n\}$ $L_{V_j} = \{i \in [1:n] : Z(u_{j,i}|u_j^{1:i-1}) \leq \delta_n\} \qquad \text{[mathematical formula 5]}$ Here, an ith bit of a jth page in a set of $H_{V_j|V_{[1,j-1]}}$ has a following characteristic. The characteristic is that the ith bit is independent of previous bits ($U_j^{i-1}$) in the same page, is independent of a j−1th page (previous page, $v_{[1,j-1]}^{1:n}$) and has a Bernoulli probability distribution (½). Since bit indexes that belong to this set are independent of other bits, the set may be considered as a good channel into which a message (or data) is allowed to be loaded.

Indexes that belong to a set $L_{V_j|V_{[1,j-1]}}$ have a following characteristic. The characteristic is that the indexes are dependent on previous bits ($U_j^{i-1}$) in the same page and are dependent on a j−1th page (previous page, $v_{[1,j-1]}^{1:n}$). Since the bit indexes that belong to this set are deterministically determined by other bits, this set is inappropriate to load an independent message.

A bit index i that belongs to a set $H_{V_j|Y_j}$ has a following characteristic. The characteristic is that the bit index i is independent of previous bits ($U_j^{i-1}$) in the same page and is independent of a memory sensing result ($Y_j^n$) in the same page. Even if the bit indexes that belong to this set have accurate information about a jth page in the process of decoding, the bit indexes cannot recover $U_{j,i}$.

Since the $U_{j,i}$ is completely dependent on($U_j^{i-1}$, $Y_j^n$), an index i that belongs to $L_{V_j|Y_j}$ can recover $U_{j,i}$ with information about($U_j^{i-1}$, $Y_j^n$). That is, channel indexes that belong to this set may be considered as a good channel for decoding.

A set $H_{V_j}$ and a set $L_{V_j}$ may be interpreted similar to the aforementioned description. As described above, good bit indexes necessary for an encoding and good bit indexes necessary for a decoding belong to different sets. Thus, an RIO encoder and an RIO decoder can be embodied by properly combining the bit indexes to divide the combined bit indexes into channels that can load a message and channels which are advantageous in a decoding.

In the description that follows, a process of generating an RIO code and a process of an RIO encoding will be described. For convenience of description, a transmission method using a polar code will be described with respect to the case where there are two pages. The same method can be applied to the case where there are more three pages. Data to be stored in the first page is determined as follows. Bhattacharyya parameters are obtained by each bit index and the data is classified as three sets like a mathematical formula below.

Figure 11:
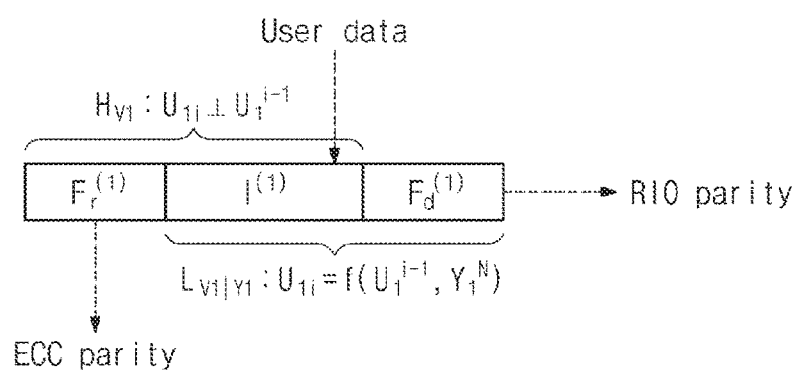
FIG. 11 is a view illustrating an encoding process of a first page according to example embodiments of the disclosure.

$I^{(1)} = H_{V_1} \cap L_{V_1|Y_1}$ $F_r^{(1)} = H_{V_1} \cap L_{V_1|Y_1}^C$ $F_d^{(1)} = H_{V_1}^C \qquad \text{[mathematical formula 6]}$ FIG. 11 is a view illustrating an encoding process of a first page according to example embodiments of the disclosure. A first user loads user data into indexes that belong to a set $I^{(1)}$. Here, since $i \in I^{(1)}$ belongs to the $H_{V_1}$, $U_{1,i}$ can load a message independently of a sequentially generated $U_1^{i-1}$ before. Since the also $i \in I^{(1)}$ belongs to the $L_{V_1|Y_1}$, $\hat{U}_{1,i}$ can be recovered using $Y_1^n$ which a user received and $\widehat{U_1^{i-1}}$ recovered before. An encoding method and a decoding method of the remaining sets $F_r^{(1)}$ and $F_d^{(1)}$ may be determined depending on a characteristic of sets to which the remaining sets $F_r^{(1)}$ and $F_d^{(1)}$ belong.

The first page determines each channel input signal using an encoding method like a mathematical formula below.

$$u_{1i} = \begin{cases} \text{message bit} & \text{if } i \in I^{(1)} \\ 0 & \text{if } i \in F_r^{(1)} \\ \text{argmax}_{u_{1i}} p(u_{1i} | u_1^{1:i-1}) & \text{if } i \in F_d^{(1)} \end{cases}$$ [mathematical formula 7]

A $V_1^n$ is calculated by multiplying the determined signal $U_1^n$ by a reverse deflection matrix $G_n^{-1}$. After calculating an encoding result $V_2^n$ of another page, the $V_1^n$ is mapped to a state of a nonvolatile memory device.

Figure 12:
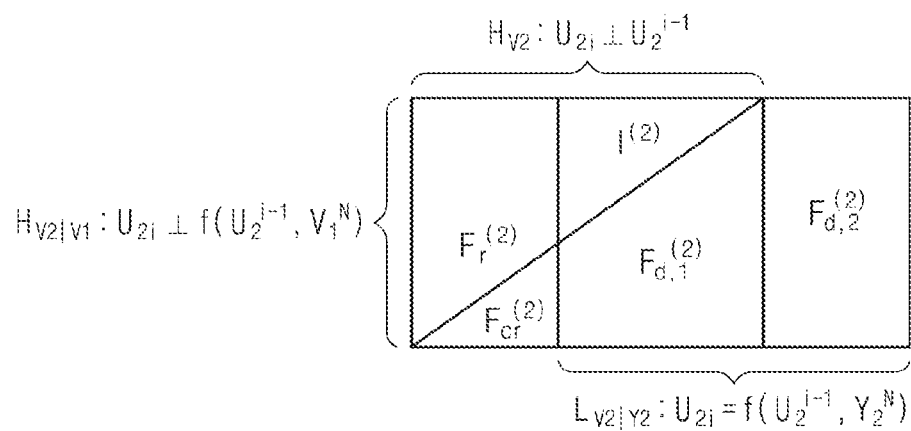
FIG. 12 is a view illustrating an encoding process of a second page according to example embodiments of the disclosure.

FIG. 12 is a view illustrating an encoding process of a second page according to example embodiments of the disclosure. In the second page, each bit index is classified as five sets like a mathematical formula below.

$$\begin{aligned} I^{(2)} &= H_{V_2|V_1} \cap L_{V_2|Y_2} \\ F_r^{(2)} &= H_{V_2|V_1} \cap L_{V_2|Y_2}^c \\ F_{d,1}^{(2)} &= H_{V_2|V_1}^c \cap H_{V_2} \cap L_{V_2|Y_2} \\ F_{d,2}^{(2)} &= H_{V_2|V_1}^c \cap H_{V_2}^c \cap L_{V_2|Y_2} \\ F_{cr}^{(2)} &= H_{V_2|V_1}^c \cap L_{V_2|Y_2}^c \end{aligned}$$ [mathematical formula 8]

In the bit index classification in the second page, bit indexes that belong to a set $F_{cr}^{(2)}$, if the bit indexes do not know information VP stored in the first page, have a characteristic which is incapable of being accurately recovered. Since an additional memory sensing operation is needed to know information stored in the first page, this is in violation of the purpose of reading data through one memory sensing operation. Fortunately, when the n is sufficiently great, it can be logically proved that a size of $F_{cr}^{(2)}$ is 0.

Figure 13:
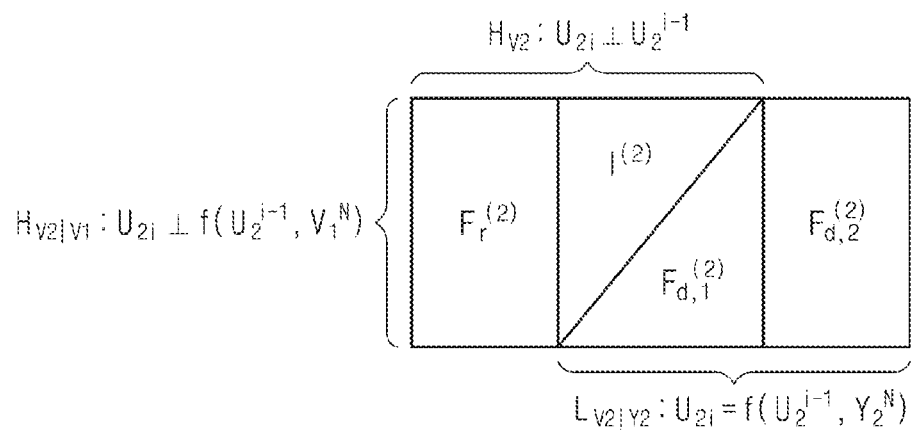
FIG. 13 is a view illustrating a simplified encoding process of a second page according to example embodiments of the disclosure.

FIG. 13 is a view illustrating a simplified encoding process of a second page according to example embodiments of the disclosure. Referring to FIG. 13, an encoding of a page becomes simple as follows.

A second page loads user data into indexes that belong to $I^{(2)}$. Here, since $i \in I^{(2)}$ belongs to the $H_{V_2|V_1}$, $U_{2i}$ can load a message independently of a sequentially generated $U_2^{i-1}$ before and a message $V_1^n$ of the first user $\hat{u}_{14}$. Since the $i \in I^{(2)}$ also belongs to the $L_{V_2|Y_2}$, $\widehat{U_{2i}}$ can be recovered using $Y_2^n$ which a user received and $\widehat{U_2^{i-1}}$ recovered before.

An encoding method and a decoding method of the remaining sets $F_r^{(2)}$ and $F_{d,1}^{(2)}$, $F_{d,2}^{(2)}$ may be determined depending on a characteristic of sets to which the remaining sets $F_r^{(2)}$ and $F_{d,1}^{(2)}$, $F_{d,2}^{(2)}$ belong.

The second page determines each channel input signal using an encoding method according to a mathematical formula below.

$$u_{2i} = \begin{cases} \text{message bit} & \text{if } i \in I^{(2)} \\ \text{argmax}_{u_{2i}} p(u_{2i} | u_2^{1:i-1} v_1^n) & \text{if } i \in F_{d,1}^{(2)} \cup F_{d,2}^{(2)} \\ \text{argmax}_{u_{2i}} p(u_{1i} | u_2^{1:i-1}) & \text{if } i \in F_r^{(2)} \end{cases}$$ [mathematical formula 9]

A $V_2^n$ is calculated by multiplying the determined signal $U_2^n$ by a reverse deflection matrix $G_n^{-1}$. After obtaining the $V_1^n$ and the $V_2^n$, a $X^n$ is calculated using a reverse mapping of a function $x(v_1, v_2)$ like a mathematical formula below.

$$x_i \in x^{-1}(v_{1i}) \cap x^{-1}(v_{2i}), i=1, 2, \ldots, n.$$ [mathematical formula 10]

If $x^{-1}(v_{1i}) \cap x^{-1}(v_{2i})$ is a null set, a transmitter declares an error.

A process of an RIO decoding is described below.

A decoding process of the first page proceeds like a mathematical formula below.

$$u_{2i} = \begin{cases} \text{message bit} & \text{if } i \in I^{(2)} \\ \text{argmax}_{u_{2i}} p(u_{2i} | u_2^{1:i-1} v_1^n) & \text{if } i \in F_{d,1}^{(2)} \cup F_{d,2}^{(2)} \\ \text{argmax}_{u_{2i}} p(u_{1i} | u_2^{1:i-1}) & \text{if } i \in F_r^{(2)} \end{cases}$$ [mathematical formula 11]

In the process of the decoding and the encoding, a calculation process with respect to posteriori probability is repeated several times. Using a successive cancellation algorithm or a list successive cancellation algorithm, computational complexity can be reduced.

As an example, the probability of $p(u_{1i} | \hat{u}_1^{1:i-1} y_1^{1:n})$ can be recursively calculated like mathematical formulas below.

[mathematical formula 12]

$$p(u_{1(2i-1)} = 0 | \hat{u}_{1,o}^{1:2i-2}, y_1^{1:n}) = \\ p(u_{1i} = 0 | \hat{u}_{1,o}^{1:2i-2} \oplus \hat{u}_{1,e}^{1:2i-2}, y_1^{1:\frac{n}{2}}) + \\ p(u_{1i} = 0 | \hat{u}_{1,e}^{1:2i-2}, y_1^{\frac{n}{2}+1:n}) + \\ p(u_{1i} = 1 | \hat{u}_{1,o}^{1:2i-2} \oplus \hat{u}_{1,e}^{1:2i-2}, y_1^{1:\frac{n}{2}}) p(u_{1i} = 1 | \hat{u}_{1,e}^{1:2i-2}, y_1^{\frac{n}{2}+1:n})$$

-continued

[mathematical formula 13]

$$p(u_{1(2i)} = 0 \mid \hat{u}_1^{1:2i-1}, y_1^{1:n}) =$$

$$\begin{cases}
\dfrac{p\left(u_{1i} = 0 \mid \hat{u}_{1,o}^{1:2i-2} \oplus \hat{u}_{1,e}^{1:2i-2}, y_1^{1:\frac{n}{2}}\right) \\
\quad p\left(u_{1i} = 0 \mid \hat{u}_{1,e}^{1:2i-2} y_1^{\frac{n}{2}+1:n}\right)}{p\left(u_{1i} = 0 \mid \hat{u}_{1,o}^{1:2i-2} \oplus \hat{u}_{1,e}^{1:2i-2}, y_1^{1:\frac{n}{2}}\right)} \text{ if } \hat{u}_{2i-1} = 0 \\
\quad p\left(u_{1i} = 0 \mid \hat{u}_{1,e}^{1:2i-2} y_1^{\frac{n}{2}+1:n}\right) + \\
\quad p\left(u_{1i} = 1 \mid \hat{u}_{1,o}^{1:2i-2} \oplus \hat{u}_{1,e}^{1:2i-2}, y_1^{1:\frac{n}{2}}\right) \\
\quad p\left(u_{1i} = 0 \mid \hat{u}_{1,e}^{1:2i-2} y_1^{\frac{n}{2}+1:n}\right) \\
\dfrac{p\left(u_{1i} = 1 \mid \hat{u}_{1,o}^{1:2i-2} \oplus \hat{u}_{1,e}^{1:2i-2}, y_1^{1:\frac{n}{2}}\right) \\
\quad p\left(u_{1i} = 0 \mid \hat{u}_{1,e}^{1:2i-2} y_1^{\frac{n}{2}+1:n}\right)}{p\left(u_{1i} = 0 \mid \hat{u}_{1,o}^{1:2i-2} \oplus \hat{u}_{1,e}^{1:2i-2}, y_1^{1:\frac{n}{2}}\right)} \text{ if } \hat{u}_{2i-1} = 1 \\
\quad p\left(u_{1i} = 1 \mid \hat{u}_{1,e}^{1:2i-2} y_1^{\frac{n}{2}+1:n}\right) + \\
\quad p\left(u_{1i} = 1 \mid \hat{u}_{1,o}^{1:2i-2} \oplus \hat{u}_{1,e}^{1:2i-2}, y_1^{1:\frac{n}{2}}\right) \\
\quad p\left(u_{1i} = 0 \mid \hat{u}_{1,e}^{1:2i-2} y_1^{\frac{n}{2}+1:n}\right)
\end{cases}$$

This can be calculated using the same method even in a different posteriori probability such as $p(u_{1i}|\hat{u}_1^{1:i-1})$. Determining each probability recursively shows high complexity of $n^2$. Thus, a graph type algorithm is used.

Figure 14:
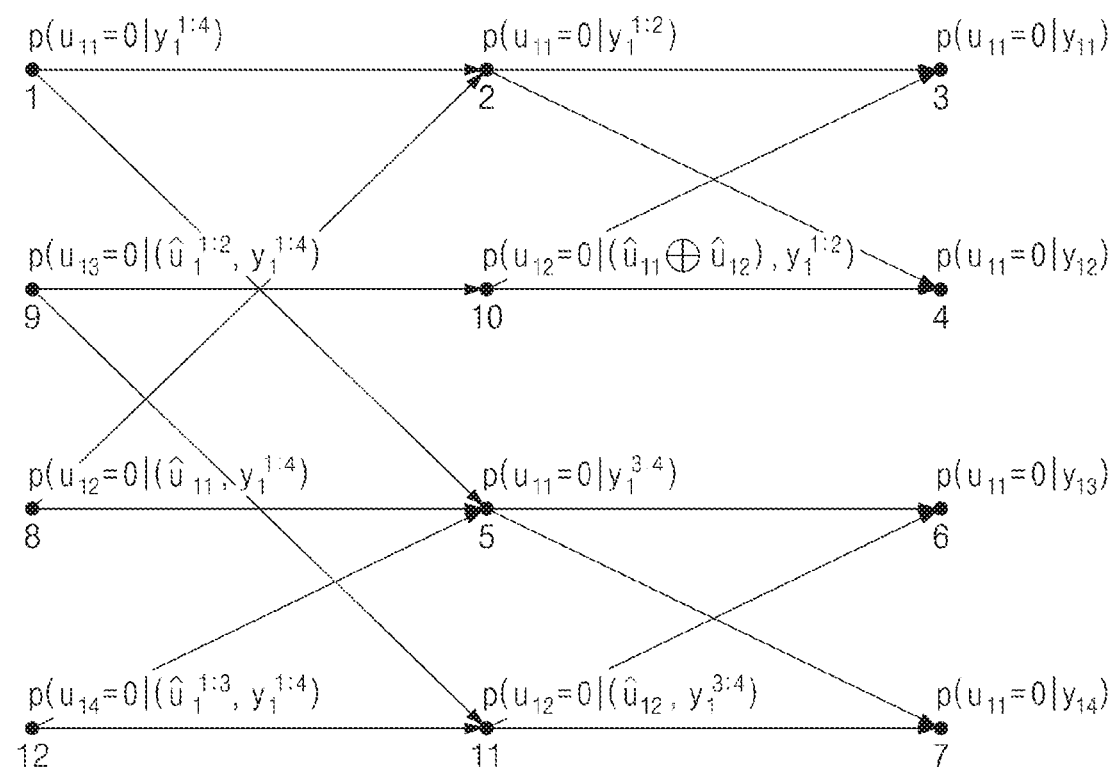
FIG. 14 is a view illustrating a successive cancellation process using a graph type algorithm according to example embodiments of the disclosure.

FIG. 14 is a view illustrating a successive cancellation process using a graph type algorithm according to example embodiments of the disclosure.

When 4 bits are transmitted through a channel, assume a transmission in a situation in which second and fourth bits belong to $I^{(1)}$ and first and third bits belong to $F_d^{(1)}$. A $y_1^{1:4}$ is a result of an output unit received through a channel.

Nodes above are illustrated in the order of being generated according to an algorithm respectively. 1, 8, 9, and 12 nodes on the left correspond to the case where i is 1, 2, 3 and 4 respectively in $p(u_{1i}|\hat{u}_1^{1:i-1}y_1^{1:n})$. 3, 4, 6 and 7 nodes on the right can be calculated in a probability distribution of an original channel before a channel deflection is applied.

In the case where a channel that applies a polar code is a binary symmetric channel having crossover probability of p, the p can be calculated to $$(u_{11} = 0 \mid y_{11}) = \begin{cases} 1-p & \text{if } y_{11} = 0 \\ p & \text{if } y_{11} = 1 \end{cases}.$$

First, $p(u_{11}|y_1^{1:4})$ has to be calculated in a 1 node. At this time, the 1 node generates a 2 node and a 5 node, and the 2, 5 nodes generate 3, 4 nodes and 6, 7 nodes respectively. In this case, after calculating $p(u_{1i}=0|y_{1i})$ according to an original channel in the 3,4,6,7 nodes, the calculated value is returned to the 1 node through the recursive mathematical formula 12 once more after calculating values of $p(u_{11}|y_1^{1:2})$ $p(u_{11}|y_1^{3:4})$ needed in the 2, 5 nodes respectively through the recursive mathematical formula 12.

Similarly, $p(u_{1i})$ may be calculated in the method of constituting a graph. Since a first bit belongs to $F_d^{(1)}$, if the probability of $p(u_{1i}=0)$ is greater ½, the first bit is decoded to $\hat{u}_{11}=0$ and except for that, the first bit is decoded to 1.

In a next 8 node, $p(u_{12}|\hat{u}_{11}y_1^{1:4})$ has to be calculated. Since 2, 5 nodes were already calculated, $p(u_{12}|\hat{u}_{11}y_1^{1:4})$ can be calculated by substituting the calculated values of the 2, 5 nodes for the recursive mathematical formula 13. Using the same method, $p(u_{12}|\hat{u}_{11})$ can be calculated. Since the second bit belongs to $I^{(1)}$, $\hat{u}_{12}$ is decoded based on $p(u_{12}|\hat{u}_{11}y_1^{1:4})$.

In a third bit, $p(u_{13}|\hat{u}_1^{1:2}y_1^{1:4})$ is calculated. In this case, a 9 node generates 10, 11 nodes and the 10, 11 nodes substitute the values calculated in the 3, 4 nodes and the values calculated in the 6, 7 nodes for the recursive mathematical formula 13 to generate the respective probabilities $p(u_{12}=0|(\hat{u}_{11} \oplus \hat{u}_{12}), y_1^{1:2})$ and $p(u_{12}=0|\hat{u}_{12}, y_1^{3:4})$. After that, the 9 node substitutes the value calculated in the 10, 11 nodes for the recursive mathematical formula 12 to calculate $p(u_{13}|\hat{u}_1^{1:2}y_1^{1:4})$. Using the same method, $p(u_{13}|\hat{u}_1^{1:2})$ can be calculated. In this case, since the third bit belongs to $F_d^{(1)}$, $\hat{u}_{13}$ may be decoded based on $p(u_{13}|\hat{u}_1^{1:2})$.

In a fourth bit, $p(u_{14}|\hat{u}_1^{1:3}y_1^{1:4})$ is calculated. In this case, a 12 node substitutes the value calculated in the 10, 11 nodes for the recursive mathematical formula 13 to calculate $p(u_{14}|\hat{u}_1^{1:3}y_1^{1:4})$. Using the same method, $p(u_{14}|\hat{u}_1^{1:3})$ can be calculated. Since the last bit belongs to $I^{(1)}$, $\hat{u}_{14}$ is decoded based on $p(u_{14}|\hat{u}_1^{1:3}y_1^{1:4})$.

Through the method described above, the complexity of the RIO encoding and the RIO decoding of the disclosure may be reduced to o(nlogn). The storage device and the method of operating the same according to example embodiments of the disclosure may perform an RIO encoding/decoding operation that extracts a part of user data while correcting an error that occurred by only a one-time memory sensing operation in a multi-level cell memory.

A storage device including a memory having MLCs according to example embodiments of the disclosure may include an RIO encoder that receives data to be programmed in a memory area and can extract the received data by only a one-time memory sensing operation and recover a bit error at the same time. A storage device according to example embodiments of the disclosure may include an RIO decoder that can recover a bit error and extract a part of user data at the same time using a signal obtained through a one-time memory sensing operation.

The disclosure can be applied to a data server.

Figure 15:
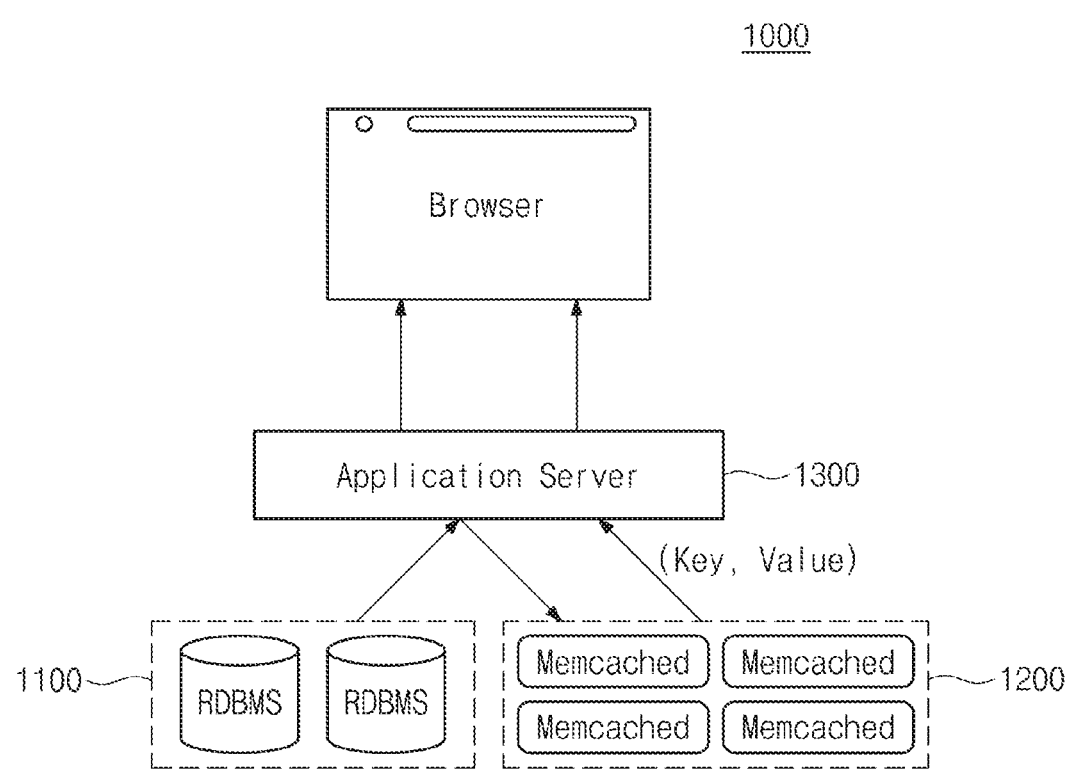
FIG. 15 is a block diagram illustrating a data server system according to example embodiments of the disclosure.

FIG. 15 is a block diagram illustrating a data server system 1000 according to example embodiments of the disclosure. Referring to FIG. 15, the data server system 1000 may include a data base management system (RDBMS) 1100, a cache server 1200, and an application server 1300.

The cache server 1200 may include key value storage that maintains and deletes different pairs of key and value in response to an invalidation notice from the data base management system 1100.

At least one of the data base management system (RDBMS) 1100, the cache server 1200, and the application server 1300 may be embodied through the storage device and the method of operating the same described in FIGS. 1 through 14. As a result, a data management environment having a good channel characteristic and improved read performance can be prepared.

The storage device and the method of operating the same can read a part of user data while recovering a channel error by decoding data read by a one-time sensing operation using an RIO code having a channel coding. Accordingly, read performance is improved but at the same time a channel error can be greatly reduced.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The contents described above are specific examples for implementing the disclosure. The disclosure may include not only the embodiments described above but also embodiments in which a design is simply or easily capable of being changed. The disclosure may also include technologies easily changed to be implemented using the aforementioned embodiments.

What is claimed is:

1. A method of operating a storage device, the method comprising:
encoding, as encoded data, user data using a random input/output (RIO) code;
programming the encoded data in multilevel cells each storing k-bit data, wherein k is an integer greater than 1;
reading, as read data, a part of the encoded data from the multilevel cells by fewer than $$\left\lfloor \frac{2^k - 1}{k} \right\rfloor$$

number of sensing operations, where $\lfloor \ \rfloor$ is a floor operator; and
decoding the read data while correcting a channel error using the RIO code, wherein:
the RIO code includes a channel code for correcting the channel error.

2. The method of claim 1, wherein the RIO code is embodied using a polar code.

3. The method of claim 2, wherein the encoded data comprises message bits, channel code parity, and RIO code parity.

4. The method of claim 3, wherein a location of at least one of the message bits, the channel code parity, and the RIO code parity in the encoded data is determined by conditional entropy.

5. The method of claim 3, wherein a location of at least one of the message bits, the channel code parity, and the RIO code parity in the encoded data is determined by a Bhattacharyya parameter.

6. The method of claim 3, wherein the channel code parity is set to a bit '0' in the encoded data.

7. The method of claim 3, wherein the RIO code parity in the encoded data is determined by a method of successive cancellation or list successive cancellation.

8. A method of decoding information stored by a storage device including a nonvolatile memory device having k-bit multilevel cells and a memory controller that controls the nonvolatile memory device, the method comprising:
performing fewer than $$\left\lfloor \frac{2^k - 1}{k} \right\rfloor$$

number of sensing operations of the multilevel cells, wherein k is an integer greater than 1 and $\lfloor \ \rfloor$ is a floor operator;
decoding, as decoded pages, pages corresponding to each of the sensing operations while correcting a channel error using a random input/output (RIO) code; and
extracting user data from the decoded pages.

9. The method of claim 8, further comprising correcting an error of each of the decoded pages using an error correction code (ECC).

10. The method of claim 8, wherein the decoding the pages comprises decoding each of corresponding pages by a plurality of RIO decoders.

11. The method of claim 8, wherein the RIO code comprises a polar code.

12. The method of claim 11, wherein each of the decoded pages comprises message bits, error correction code (ECC) parity, and RIO code parity.

13. The method of claim 12, wherein a location of at least one of the message bits, the ECC parity, and the RIO code parity is determined by conditional entropy.

14. The method of claim 12, wherein a location of at least one of the message bits, the ECC parity, and the RIO code parity is determined by a Bhattacharyya parameter.

15. A storage device comprising:
a nonvolatile memory device having k-bit multilevel cells, wherein k is an integer greater than 1; and a memory controller that controls the nonvolatile memory device, wherein:

the memory controller comprises:

an error correction encoder configured to encode user data using a first code to produce first-encoded data;

an RIO encoder configured to encode the first-encoded data using a second code;

an RIO decoder configured to decode, as decoded pages, pages read from the k-bit multilevel cells through fewer than $$\left\lfloor \frac{2^k - 1}{k} \right\rfloor$$

number of sensing operations while recovering a channel error, wherein $\lfloor \ \rfloor$ is a floor operator; and an error correction decoder configured to decode each of the decoded pages using the first code to correct an error.

16. The storage device of claim 15, wherein each of the decoded pages comprises message bits, error correction code (ECC) parity, and RIO code parity.

17. The storage device of claim 16, wherein a location of at least one of the message bits, the ECC parity, and the RIO code parity is determined by conditional entropy.

18. The storage device of claim 16, wherein a location of at least one of the message bits, the ECC parity, and the RIO code parity is determined by a Bhattacharyya parameter.

* * * * *